United States Patent
Alexander et al.

(10) Patent No.: US 10,747,000 B2
(45) Date of Patent: *Aug. 18, 2020

(54) SYSTEMS, DEVICES, AND METHODS FOR HOLOGRAPHIC OPTICAL ELEMENTS

(71) Applicant: NORTH INC., Kitchener (CA)

(72) Inventors: Stefan Alexander, Elmira (CA); Liang Yuan, Kitchener (CA)

(73) Assignee: North Inc., Kitchener, ON (CA)

( * ) Notice: Subject to any disclaimer, the term of this patent is extended or adjusted under 35 U.S.C. 154(b) by 195 days.

This patent is subject to a terminal disclaimer.

(21) Appl. No.: 15/957,449

(22) Filed: Apr. 19, 2018

(65) Prior Publication Data

US 2018/0307048 A1    Oct. 25, 2018

Related U.S. Application Data

(60) Provisional application No. 62/487,303, filed on Apr. 19, 2017.

(51) Int. Cl.
*G02B 27/01* (2006.01)
*G03H 1/02* (2006.01)
(Continued)

(52) U.S. Cl.
CPC .... *G02B 27/0172* (2013.01); *B29D 11/00009* (2013.01); *B29D 11/0073* (2013.01);
(Continued)

(58) Field of Classification Search
CPC ........ G02B 27/0172; G02B 2027/0105; G02B 2027/013; G02B 2027/0174; G02B 2027/0178; G02B 2027/0181; G02B 2027/0183; G02B 27/0103; G02B 2027/0107; G02B 2027/0109; G02B 2027/011; G02B 2027/0112; G02B 2027/0114; G02B 2027/0116;
(Continued)

(56) References Cited

U.S. PATENT DOCUMENTS 5,526,145 A * 6/1996 Weber .................... G02B 5/201
  349/104
6,426,812 B2 * 7/2002 Ichikawa ............... G02B 5/203
  349/106

(Continued)

*Primary Examiner* — Jennifer D. Carruth
(74) *Attorney, Agent, or Firm* — Thomas Mahon

(57) ABSTRACT

Systems, devices, and methods for holographic optical elements are described. A holographic optical element includes a first layer of holographic material and a second layer of holographic material. The first layer of holographic material includes a first hologram responsive to light in a first waveband and a second hologram responsive to light in a second waveband. The second layer of holographic material includes a third hologram responsive to light in a third waveband and may include a fourth hologram responsive to light in a fourth waveband. The first, second, third, and fourth wavebands are distinct and may comprise light of red, blue, green, and infrared wavelengths, respectively. Distribution of the three or four holograms on two layers of holographic material allows each hologram to have an index modulation of greater than 0.016, a diffraction efficiency of greater than 15%, and an angular bandwidth of greater than 12°.

9 Claims, 5 Drawing Sheets

(51) Int. Cl.
*G03H 1/22* (2006.01)
*G03H 1/26* (2006.01)
*B29D 11/00* (2006.01)
*G03H 1/18* (2006.01)
*G03H 1/04* (2006.01)

(52) U.S. Cl.
CPC ......... *G03H 1/0236* (2013.01); *G03H 1/0248* (2013.01); *G03H 1/0252* (2013.01); *G03H 1/0272* (2013.01); *G03H 1/182* (2013.01); *G03H 1/2202* (2013.01); *G03H 1/2286* (2013.01); *G03H 1/26* (2013.01); *G02B 2027/013* (2013.01); *G02B 2027/0105* (2013.01); *G02B 2027/0174* (2013.01); *G02B 2027/0178* (2013.01); *G03H 2001/0212* (2013.01); *G03H 2001/0224* (2013.01); *G03H 2001/0264* (2013.01); *G03H 2001/0439* (2013.01); *G03H 2001/2231* (2013.01); *G03H 2001/2292* (2013.01); *G03H 2001/2615* (2013.01); *G03H 2222/12* (2013.01); *G03H 2222/16* (2013.01); *G03H 2222/18* (2013.01); *G03H 2225/52* (2013.01); *G03H 2240/54* (2013.01); *G03H 2250/10* (2013.01); *G03H 2260/12* (2013.01); *G03H 2270/21* (2013.01); *G03H 2270/55* (2013.01)

(58) Field of Classification Search
CPC ...... G02B 2027/0118; G02B 2027/012; G02B 2027/0123; G02B 2027/0125; G02B 2027/0127; G02B 2027/0129; G02B 2027/0132; G02B 2027/0134; G02B 2027/0136; G02B 27/01; G02B 27/0101; G02B 27/017; G02B 2027/015; G02B 2027/0152; G02B 27/0176; G02B 2027/014; G03H 1/26; G03H 1/182; G03H 1/0272; G03H 1/2202; G03H 1/0248; G03H 1/0236; G03H 1/2286; G03H 1/0252; G03H 2240/54; G03H 2001/2615; G03H 2001/0439; G03H 2222/18; G03H 2270/55; G03H 2250/10; G03H 2270/21; G03H 2001/0264; G03H 2225/52; G03H 2001/2231; G03H 2001/2292; G03H 2260/12; G03H 2222/12; G03H 2001/0224; G03H 2222/16; G03H 2001/0212; G03H 2001/043; G03H 2240/25; B29D 11/0073; B29D 11/00009

See application file for complete search history.

(56) References Cited

U.S. PATENT DOCUMENTS

| | | | |
|---|---|---|---|
| 2011/0164294 A1* | 7/2011 | Shimizu | G02B 27/0172 359/13 |
| 2016/0349514 A1* | 12/2016 | Alexander | G02B 26/0833 |
| 2018/0307046 A1* | 10/2018 | Alexander | G02B 27/0172 |

* cited by examiner

SYSTEMS, DEVICES, AND METHODS FOR HOLOGRAPHIC OPTICAL ELEMENTS

TECHNICAL FIELD

The present systems, devices, and methods generally relate to holographic optical elements and particularly relate to holographic optical elements in wearable heads-up displays.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that the display does not completely block the user from being able to see their external environment. Examples of wearable heads-up displays include: the Google Glass®, the Optinvent Ora®, the Epson Moverio®, and the Sony Glasstron®, just to name a few. Wearable heads-up displays may employ holographic optical elements to create and display an image to the user.

Holographic Optical Elements

For the purposes of the present systems, devices, and methods, a holographic optical element is an optical element that includes at least one hologram. Generally, a holographic optical element comprises a layer of holographic material with at least one hologram recorded, embedded, stored, or carried (collectively, "included") therein or thereon. Several parameters can be used to define the function of a holographic optical element including index modulation, diffraction efficiency, and angular bandwidth. The index modulation of a holographic optical element is the change in the holographic material refractive index from before the hologram is recorded to after the hologram is recorded and is an indication of the ability of the holographic optical element to diffract light. The diffraction efficiency is the ratio of the power of the light diffracted by the holographic optical element to the power of the light incident on the holographic optical element and can be represented as a percentage. The angular bandwidth of the holographic optical element is the range of angles of incidence which are diffracted by the holographic optical element. If a single layer of holographic material is recorded with multiple holograms, the total index modulation and diffraction efficiency of the holographic optical element is divided amongst the individual holograms. Consequently, there is less index modulation and diffraction efficiency available for each hologram when multiple holograms are present.

Photopolymer

A photopolymer is a material that changes one or more of its physical properties when exposed to light. The changes may be manifested in different ways, including structurally and/or chemically. Photopolymer materials are often used in holography as the film or medium within or upon which a hologram is recorded. For example, a photopolymer film may be controllably exposed/illuminated with a particular interference pattern of light to cause surface relief patterns to form in/on the photopolymer film, the surface relief patterns conforming to the interference pattern of the illuminating light. It is these changes in physical properties of the photopolymer that determine the index modulation, diffraction efficiency, and angular bandwidth of a hologram as discussed above. A photopolymer film may comprise only photopolymer material itself, or it may comprise photopolymer carried on or between any or all of: a substrate, such as triacetate and/or polyamide and/or polyimide and/or polycarbonate, and/or a fixed or removable protective cover layer. Many examples of photopolymer film are available in the art today, such as DuPont HRF photopolymer film, Darol™ photopolymer from Polygrama Inc., or Bayfol™ HX film from Bayer AG.

BRIEF SUMMARY

A holographic optical element may be summarized as including a first layer of holographic material that includes a first hologram and a second hologram and a second layer of holographic material that includes at least a third hologram, wherein each of the first hologram, the second hologram, and the at least a third hologram has a respective index modulation of at least 0.016. The first hologram may be responsive to light in a first waveband and unresponsive to light outside of the first waveband, the second hologram may be responsive to light in a second waveband and unresponsive to light outside of the second waveband, and the third hologram may be responsive to light in a third waveband and unresponsive to light outside of the third waveband, wherein the first waveband, second waveband, and third waveband are all distinct from one another with no overlap therebetween. The first waveband, the second waveband, and the third waveband may include: a red waveband comprising light of red wavelengths, a green waveband comprising light of green wavelengths, and a blue waveband comprising light of blue wavelengths.

The second layer of holographic material may further include a fourth hologram that is responsive to light in a fourth waveband and unresponsive to light outside of the third waveband, wherein the fourth waveband is distinct from the first waveband, the second waveband, and the third waveband with no overlap therebetween. The first waveband, the second waveband, the third waveband, and the fourth waveband may include: a red waveband comprising light of red wavelengths, a green waveband comprising light of green wavelengths, a blue waveband comprising light of blue wavelengths, and an infrared waveband comprising light of infrared wavelengths.

The first layer of holographic material may further include a first surface and a second surface, wherein the first surface of the first layer of holographic material is opposite the second surface of the first layer of holographic material across a thickness of the first layer of holographic material, and the second layer of holographic material may have a first surface and a second surface, wherein the first surface of the second layer of holographic material is opposite the second surface of the second layer of holographic material across a thickness of the second layer of holographic material, and the holographic optical element may further include: a first layer of substrate having a first surface and a second surface, the first surface of the first layer of substrate opposite the second surface of the first layer of substrate across a thickness of the first layer of substrate, a second layer of substrate having a first surface and a second surface, the first surface of the second layer of substrate opposite the second surface of the second layer of substrate across a thickness of the second layer of substrate, and a third layer of substrate having a first surface and a second surface, the first surface of the third layer of substrate opposite the second surface of the third layer of substrate across a thickness of the third layer of substrate; wherein: the first surface of the first layer of holographic material is physically coupled to the first surface of the first layer of substrate, the second surface of the first layer of holographic material is physically coupled to the first surface of the second layer of substrate, the first surface of the second layer of holographic material is physically coupled to the second surface of the second layer of substrate, and the second surface of the second layer of holographic material is physically coupled to the first surface of the third layer of substrate. The material of the first layer of substrate, the material of the second layer of substrate, and the material of the third layer of substrate may each be selected from a group consisting of: polycarbonate, polyamide, polyimide, and triacetate.

The holographic optical element may be curved. A respective diffraction efficiency of each of the first hologram, the second hologram, and the third hologram may be at least 15%. A respective angular bandwidth of each of the first hologram, the second hologram, and the third hologram may be at least 12°. The first layer of holographic material and the second layer of holographic material may have a thickness not greater than 8 µm. The holographic material may be a photopolymer.

A method of producing a holographic optical element that comprises a first layer of holographic material and a second layer of holographic material wherein the first layer includes a first hologram responsive to a first waveband of light and a second hologram responsive to a second waveband of light, and the second layer includes a third hologram responsive to a third waveband of light, wherein each of the first waveband, the second waveband, and the third waveband is distinct and non-overlapping, may be summarized as including: mounting the first layer of holographic material on a planar transparent surface; recording the first hologram and the second hologram in the first layer of holographic material, wherein recording includes exposing the first layer of holographic material to light in the first waveband and light in the second waveband simultaneously to provide respective index modulations of at least 0.016 to the first hologram and the second hologram; mounting the second layer of holographic material on a planar transparent surface; recording the third hologram in the holographic material wherein recording includes exposing the second layer of holographic material to light in the third waveband to provide an index modulation of at least 0.016 to the third hologram; and adhering the first layer of holographic film and the second layer of holographic film. Recording the first hologram and the second hologram in the first layer of holographic material may further includes: simultaneously exposing the first layer of holographic material to light in the first waveband having a first power and light in the second waveband having a second power for a first length of time to provide an index modulation of 0.016 to both the first hologram and the second hologram; and recording the third hologram in the second layer of holographic material may further include: exposing the second layer of holographic material to light in the third waveband having a third power for a second length of time to provide an index modulation of 0.016 to the third hologram.

The second layer of holographic film may further include a fourth hologram responsive to a fourth waveband of light, wherein the fourth waveband of light is distinct from the first waveband, the second waveband, and the third waveband with no overlap therebetween, and the method may further include: recording the fourth hologram in the second layer of holographic material, wherein recording includes exposing the second layer of material to light in the fourth waveband concurrently with the recording of the third hologram to provide an index modulation of at least 0.016 to the fourth hologram.

A first surface of the first layer of holographic material may be physically coupled to a first surface of a first layer of substrate and a first surface of the second layer of holographic material may be physically coupled to a first surface of a second layer of substrate, wherein adhering the first layer of holographic material and the second layer of holographic material may further include: adhering a second surface of the first layer of holographic material to a second surface of the second layer of substrate, the second surface of the first layer of holographic material opposite the first surface of the first layer of holographic material across a thickness of the first layer of holographic material, and the second surface of the second layer of substrate opposite the first surface of the second layer of substrate across a thickness of the second layer of substrate, and wherein the method further includes: adhering a second surface of the second layer of holographic material to a first surface of a third layer of substrate, the second surface of the second layer of holographic material opposite the first surface of the second layer of holographic material across a thickness of the second layer of holographic material.

The method may further include physically coupling the holographic optical element to the eyeglass lens. The manner of coupling the holographic optical element to the eyeglass lens may be selected from the group consisting of: adhering the holographic optical element to a surface of the eyeglass lens, embedding the holographic optical element between two halves of an eyeglass lens, and forming an eyeglass lens around the holographic optical element.

A wearable heads-up display (WHUD) may be summarized as including: a support structure that in use is worn on a head of a user, the support structure having the general shape and appearance of an eyeglass frame, at least one eyeglass lens carried by the support structure, a holographic optical element physically coupled to the at least one eyeglass lens and positioned in a field of view of the user when the support structure is worn on the head of the user, the holographic optical element comprising: a first layer of holographic material that includes a first hologram and a second hologram; and a second layer of holographic material that includes at least a third hologram, wherein each of the first hologram, the second hologram, and the third hologram has a respective index modulation of at least 0.016, and wherein: the first hologram is responsive to light in a first waveband and unresponsive to light outside of the first waveband, the second hologram is responsive to light in a second waveband and unresponsive to light outside of the second waveband, the third hologram is responsive to light in a third waveband and unresponsive to light outside of the third waveband, wherein the first waveband, the second waveband, and the third waveband are distinct and non-overlapping; and a laser projector carried by the support structure, the laser projector comprising: a first laser diode to output laser light in the first waveband, a second laser diode to output laser light in the second waveband, a third laser diode to output laser light in the third waveband, a beam combiner to combine the laser light from the laser diodes into an aggregate beam, and at least one controllable mirror to scan the aggregate beam over the holographic optical element. The first waveband, the second waveband, and the third waveband may include: a red waveband comprising light of red wavelengths, a green waveband comprising light of green wavelengths, and a blue waveband comprising light of blue wavelengths.

The at least a third hologram may include a fourth hologram that is responsive to light in a fourth waveband and unresponsive to light outside of the third waveband, wherein the fourth waveband is distinct from the first waveband, the second waveband, and the third waveband, with no overlap therebetween, and the laser projector further includes a fourth laser diode to output laser light in a fourth waveband. The first waveband, the second waveband, the third waveband, and the fourth waveband may include: a red waveband comprising light of red wavelengths, a green waveband comprising light of green wavelengths, a blue waveband comprising light of blue wavelengths, and an infrared waveband comprising light of infrared wavelengths.

The at least one eyeglass lens and the holographic optical element may be curved. A respective diffraction efficiency of each of the first hologram, the second hologram, and the third hologram may be at least 15%. The WHUD of claim 19 wherein a respective angular bandwidth of each of the first hologram, the second hologram, and the third hologram may be at least 12°. The first layer of holographic material and the second layer of holographic material may have a thickness not greater than 8 µm. The holographic material may be a photopolymer.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for holographic optical elements and are particularly well-suited for use in wearable heads-up displays.

Figure 1:
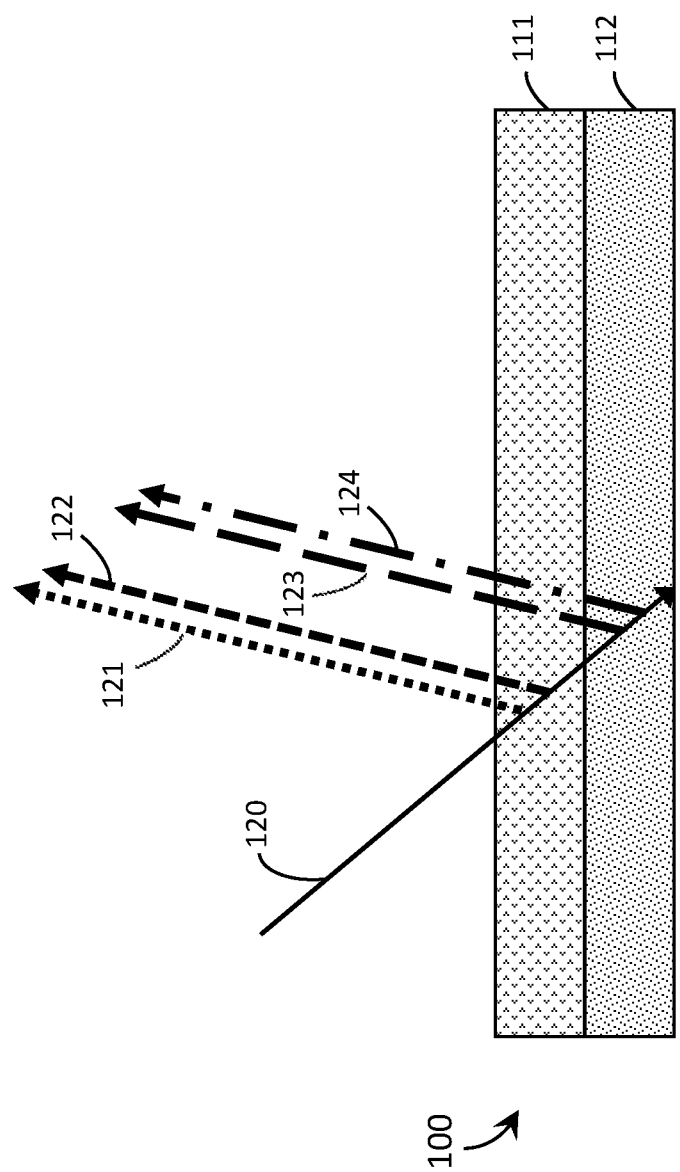
FIG. 1 is a schematic diagram of a holographic optical element in accordance with the present systems, devices, and methods.

FIG. 1 is a schematic diagram of a holographic optical element (HOE) 100 in accordance with the present systems, devices, and methods. HOE 100 includes a first layer of holographic material 111 and a second layer of holographic material 112. HOE 100 may be curved. The holographic material may be a photopolymer. First layer of holographic material 111 and second layer of holographic material 112 may both be less than 8 µm thick. First layer of holographic material 111 includes a first hologram and a second hologram, and second layer of holographic material 112 includes a third hologram and a fourth hologram. The first hologram is responsive to light in a first waveband, the second hologram is responsive to light in a second waveband, the third hologram is responsive to light in a third waveband, and the fourth hologram is responsive to light in a fourth waveband. The first waveband, second waveband, third waveband, and fourth waveband are all distinct from one another with no overlap between them. The first hologram, the second hologram, the third hologram, and the fourth hologram each have a respective index modulation of at least 0.016. Therefore, the respective index modulation of each of first layer of holographic material 111 and second layer of holographic material 112 is at least 0.032. Currently available holographic materials do not have available index modulations much greater than 0.045. Therefore, if the first hologram, the second hologram, the third hologram, and the fourth hologram were all recorded in a single layer it would be impossible to achieve respective index modulations greater than 0.016, as this would require a holographic material capable of index modulation greater than 0.064.

Distributing the holograms across two layers of holographic material enables greater index modulation for each hologram. In one embodiment, the index modulations of the first hologram, the second hologram, the third hologram, and the fourth hologram may be approximately equal (+/−0.002). In another embodiment, the respective index modulation may be significantly different for one or more of the first hologram, the second hologram, the third hologram, or the fourth hologram. The first hologram, the second hologram, the third hologram, and the fourth hologram may each have a respective diffraction efficiency of at least 15%, and a respective angular bandwidth of at least 12°. Both diffraction efficiency and angular bandwidth are affected by the thickness of the holographic material, with diffraction efficiency decreasing as thickness decreases and angular bandwidth increasing as thickness decreases. Therefore, if the first hologram, the second hologram, the third hologram, and the fourth hologram were all recorded in a single layer it may be impossible to achieve diffraction efficiencies for each hologram of at least 15% while simultaneously achieving angular bandwidths of at least 12°. Distributing the holograms across two layers of holographic material enables the layers of holographic material to be thinner and results in greater diffraction efficiency and angular bandwidth for each hologram. In HOE 100 the first waveband comprises light of red wavelengths, the second waveband comprises light of green wavelengths, the third waveband comprises light of blue wavelengths, and the fourth waveband comprises light of infrared wavelengths. A light beam 120 is incident on HOE 100. Light beam 120 includes light of red wavelengths, green wavelengths, blue wavelengths, and infrared wavelengths. When light beam 120 is incident on a specific area of HOE 100 at a specific angle it is reflected from HOE 100. A person of skill in the art will appreciate that the hologram could be a transmission hologram which transmits light instead of a reflection hologram which reflects light. In FIG. 1, four individual light signals from beam 120 are shown. Light signal 121 comprises light of red wavelengths and is incident on first layer of holographic material 111 such that light signal 121 is reflected by the first hologram. Light signal 122 comprises light of green wavelengths and is incident on first layer of holographic material 111 such that light signal 122 is reflected by the second hologram. Light signal 123 comprises light of blue wavelengths and is incident on second layer of holographic material 112 such that light signal 123 is reflected by the third hologram. Light signal 124 comprises light of infrared wavelengths and is incident on second layer of holographic material 112 such that light signal 124 is reflected by the fourth hologram. In embodiments that do not require responsiveness to a fourth distinct waveband (e.g., infrared wavelengths), second layer of holographic material 112 may not include a fourth hologram. In such an embodiment the third hologram would still have an index modulation of at least 0.016, a diffraction efficiency of at least 15%, and an angular bandwidth of at least 12°.

Figure 2:
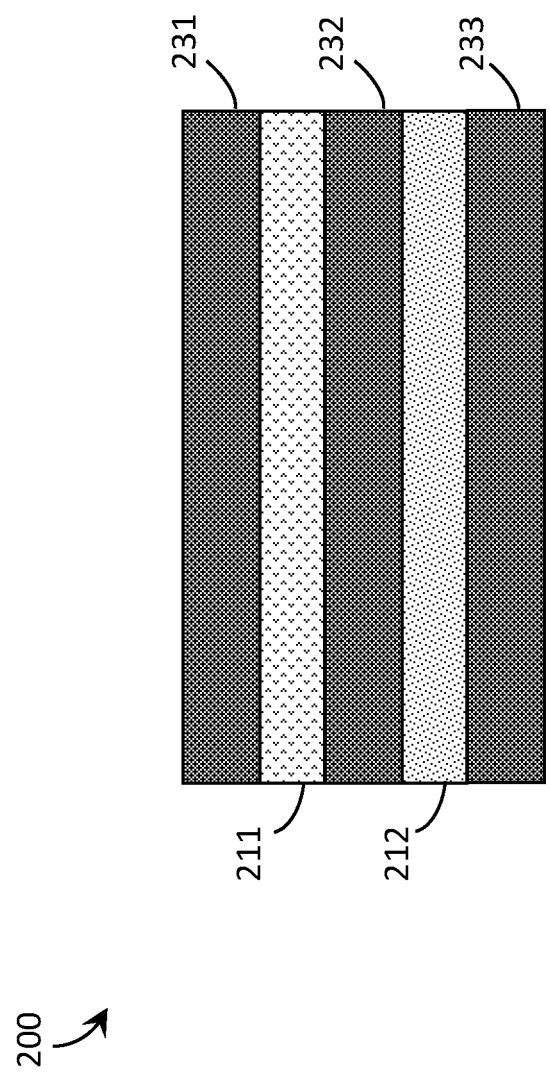
FIG. 2 is a schematic diagram of a holographic optical element with a first layer of holographic material, a second layer of holographic material, and a first layer of substrate, a second layer of substrate, and a third layer of substrate in accordance with the present systems, devices, and methods.

FIG. 2 is a schematic diagram of a holographic optical element (HOE) 200 with a first layer of holographic material 211, a second layer of holographic material 212, and a first layer of substrate 231, a second layer of substrate 232, and a third layer of substrate 233 in accordance with the present systems, devices, and methods. The first layer of holographic material 211 and the second layer of holographic material 212 are similar to first layer of holographic material 111 and second layer of holographic material 112 of FIG. 1, respectively. The holographic material may be a photopolymer. First layer of holographic material 211 is recorded with a first hologram and a second hologram, and second layer of holographic material 212 is recorded with a third hologram and a fourth hologram. The first hologram, second hologram, third hologram, and fourth hologram each have a respective index modulation of at least 0.016. Therefore, the respective index modulation of each of first layer of holographic material 211 and second layer of holographic material 212 is at least 0.032. Each of the first hologram, the second hologram, the third hologram, and the fourth hologram has a respective diffraction efficiency of at least 15%, and a respective angular bandwidth of at least 12°. The first hologram is responsive to light in a first waveband, the second hologram is responsive to light in a second waveband, the third hologram is responsive to light in a third waveband, and the fourth hologram is responsive to light in a fourth waveband. The first waveband, second waveband, third waveband, and fourth waveband are all distinct from one another with no overlap between them. Each of first layer of holographic material 211 and second layer of holographic material 212 has at least a first surface and a second surface. The first surface and the second surface of each layer of holographic material are positioned opposite one another across a thickness of the layer of holographic material. The three layers of substrate 231, 232, and 233 may be polycarbonate, polyamide, polyimide, or triacetate. Each layer of substrate has at least a first surface and a second surface positioned opposite one another across a thickness of the layer of substrate. The first surface of first layer of substrate 231 is physically coupled to the first surface of first layer of holographic material 211. The first surface of second layer of substrate 232 is physically coupled to the second surface of first layer of holographic material 211. The second surface of second layer of substrate 232 is physically coupled to the first surface of second layer of holographic material 212. The first surface of third layer of substrate 233 is physically coupled to the second surface of second layer of holographic material 212. The dimensions of the layers of holographic materials and the layers of substrate are for illustrative purposes only and are not meant to imply that any of the dimensions of the layers of holographic material or the layers of substrate are identical or similar to one another. The designation of a surface as the "first" surface or the "second" surface of either a layer of holographic material or a layer of substrate is solely used for clarity in description. HOE 200 may be a planar or curved holographic optical element and each layer of holographic material and layer of substrate may therefore be planar if HOE 200 is planar or curved if HOE 200 is curved.

Figure 3:
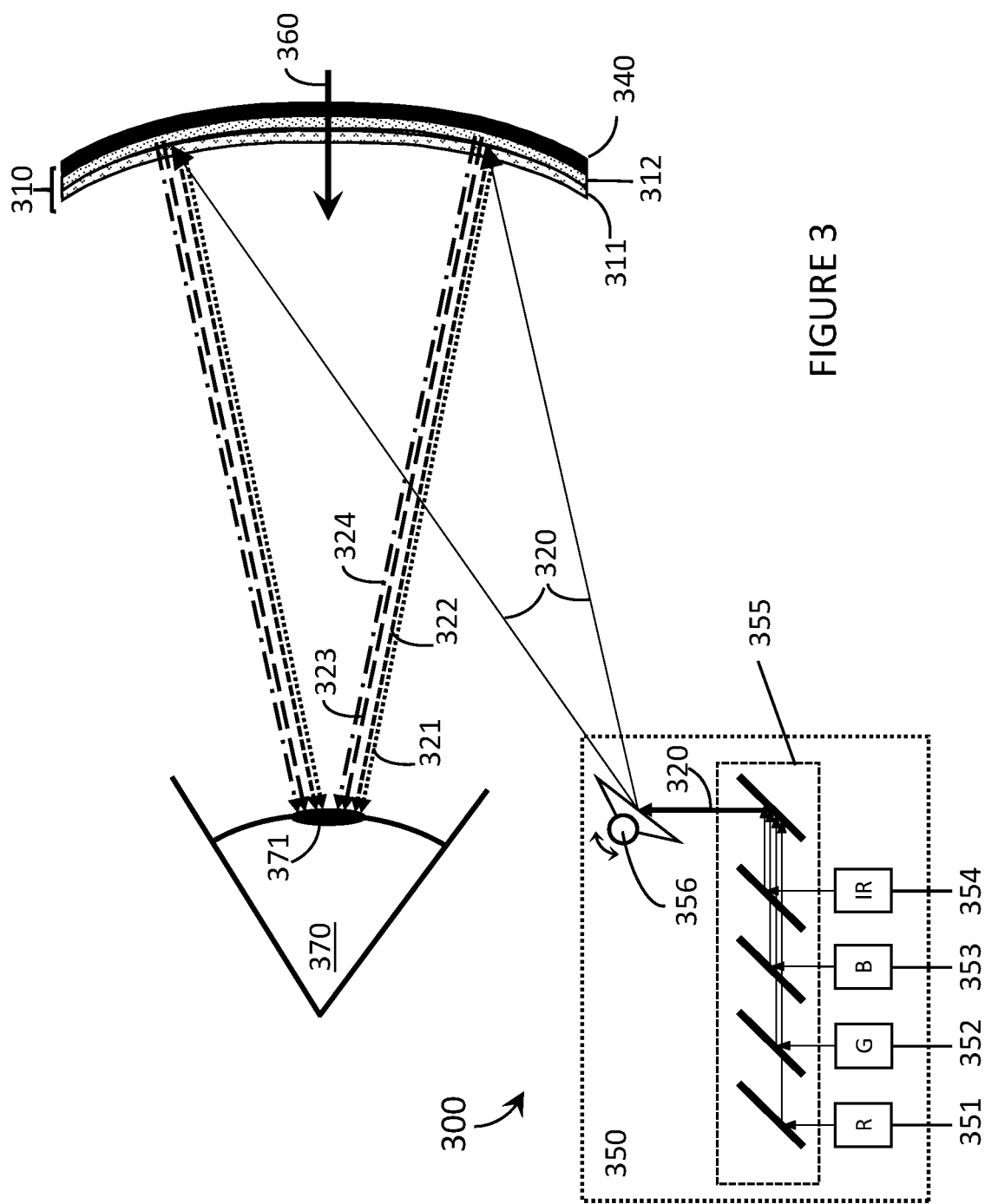
FIG. 3 is a top-view illustrative diagram of a wearable heads-up display with a laser projector and a curved holographic optical element in accordance with the present systems, devices, and methods.

FIG. 3 is a top-view illustrative diagram of a wearable heads-up display (WHUD) 300 with a laser projector 350 and a curved holographic optical element (HOE) 310 in accordance with the present systems, devices, and methods. Laser projector 350 includes a red laser diode 351, a green laser diode 352, a blue laser diode 353, an infrared laser diode 354, a beam combiner 355, and a controllable mirror 356 to scan an aggregate beam 320. HOE 310 is physically coupled to a curved eyeglass lens 340 and includes first layer of holographic material 311 and second layer of holographic material 312. The holographic material may be a photopolymer. First layer of holographic material 311 includes a first hologram and a second hologram. Second layer of holographic material 312 includes a third hologram and a fourth hologram. Each hologram has an index modulation of at least 0.016, a diffraction efficiency of at least 15%, and an angular bandwidth of at least 12°. The first hologram is responsive to light in a first waveband comprising light of red wavelengths, the second hologram is responsive to light in a second waveband comprising light of green wavelengths, the third hologram is responsive to light in a third waveband comprising light of blue wavelengths, and the fourth hologram is responsive to light in a fourth waveband comprising light of infrared wavelengths. In operation, laser diode 351 outputs red laser light in the first waveband, laser diode 352 outputs green laser light in the second waveband, laser diode 353 outputs blue laser light in the third waveband, and laser diode 354 outputs infrared laser light in the fourth waveband. Beam combiner 355 may be comprised of reflective mirrors, dichroic mirrors, and/or beam splitters and combines the laser light output from laser diodes 351, 352, 353, and 354 into aggregate beam 320. Aggregate beam 320 is directed towards controllable mirror 356 which scans the laser light onto HOE 310. The path of aggregate beam 320 from controllable mirror 356 to HOE 310 is shown as two arrows to represent the scan range of aggregate beam 320 on HOE 310. Red light signals 321 (dotted line arrows; only one line is numbered to reduce clutter) are reflected by the first hologram in first layer of holographic material 311 towards an eye 370 of a user when WHUD 300 is worn on the head of the user. Green light signals 322 (small dashed line arrows; only one line is numbered to reduce clutter) are reflected by the second hologram in first layer of holographic material 311 towards eye 370. Blue light signals 323 (large dashed line arrows; only one line is numbered to reduce clutter) are reflected by the third hologram in second layer of holographic material 312 towards eye 370. Infrared light signals 324 (dashed and dotted line arrows; only one line is numbered to reduce clutter) are reflected by the fourth hologram in second layer of holographic material 312 towards eye 370. Light reflected from HOE 310 which is incident at pupil 371 of eye 370 is visible to the user. Light signals 321, 322, 323, and 324 are reflected by HOE 310 because they are of a specific wavelength and are incident on holographic optical element 310 at a specific angle that the respective first hologram, second hologram, third hologram, and fourth hologram are responsive to. The user is able to see both the light signals generated by WHUD 300 and their environment as eyeglass lens 340, second layer of holographic material 312, and first layer of holographic material 311 are transparent to external light 360. Eyeglass lens 340 and HOE 310 are shown and described in FIG. 3 as curved but a person of skill in the art will appreciate that they may be flat or planar. A person of skill in the art will also appreciate that the first waveband, second waveband, third waveband, and fourth waveband may not be a red waveband, a green waveband, a blue waveband, and an infrared waveband, respectively, and can be comprised of any range of wavelengths, in the visible, infrared, or UV ranges, and that although the wavebands in FIG. 3 are distinct and non-overlapping in other embodiments the wavebands may overlap. HOE 310 may include layers of substrate as described in FIG. 2.

Figure 4:
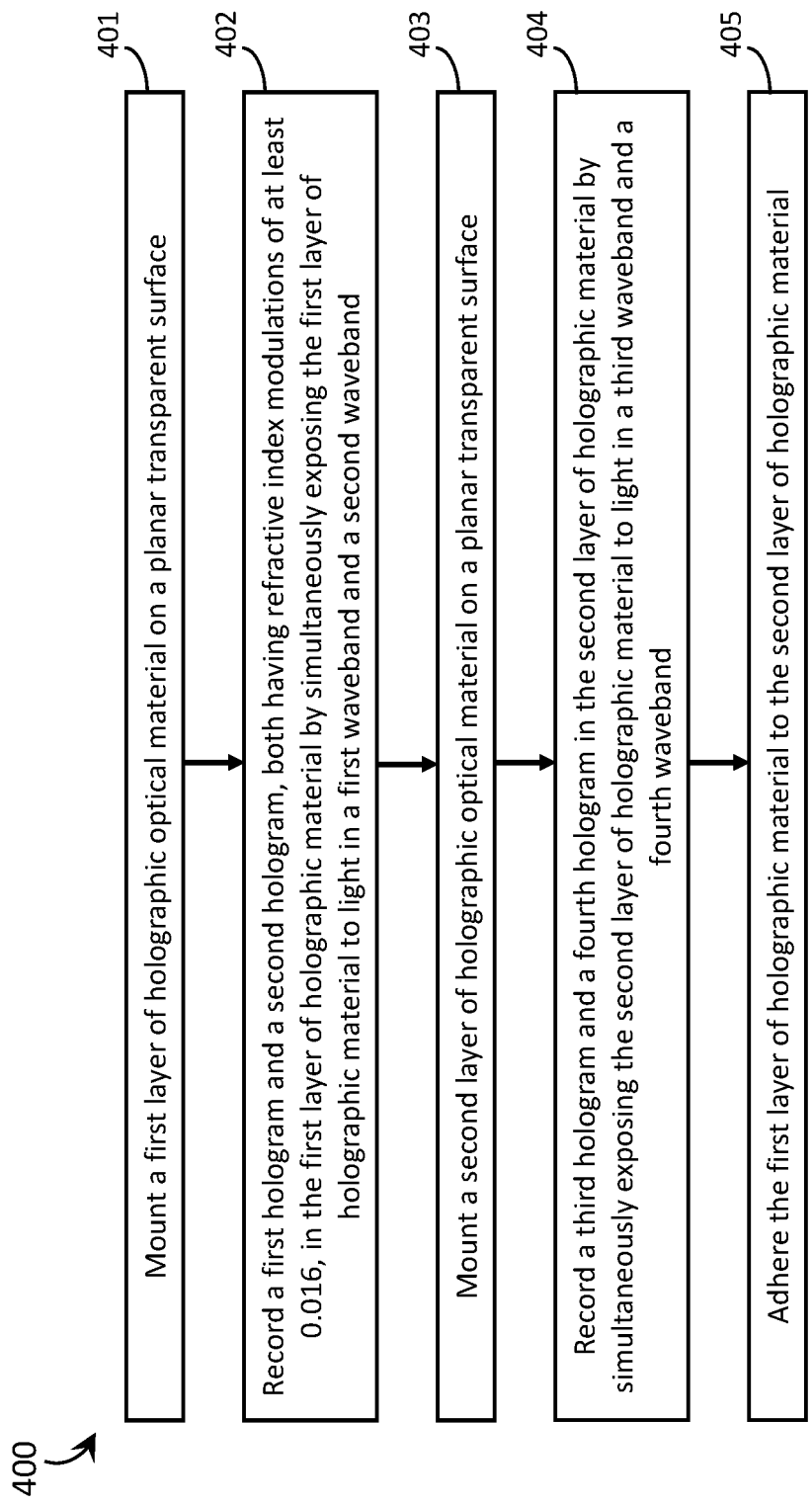
FIG. 4 is a flow diagram of a method of producing a holographic optical element wherein each hologram has an index modulation of at least 0.016 in accordance with the present systems, devices, and methods.

FIG. 4 is a flow diagram of a method 400 of producing a holographic optical element (HOE) wherein each hologram has an index modulation of at least 0.016 in accordance with the present systems, devices, and methods. The HOE of FIG. 4 may be substantially similar to HOE 100 of FIG. 1, and HOE 310 of FIG. 3 and generally includes a first layer of holographic material and a second layer of holographic material wherein the first layer of holographic material includes a first hologram responsive to light in a first waveband, and a second hologram responsive to light in a second waveband, and wherein the second layer of holographic material includes a third hologram responsive to light in a third waveband, and a fourth hologram responsive to light in a fourth waveband. The first waveband, second waveband, third waveband, and fourth waveband are all distinct and non-overlapping although a person of skill in the art will appreciate that the wavebands could overlap. As in FIGS. 1 and 3 the first waveband may comprise light of red wavelengths, the second waveband may comprise light of blue wavelengths, the third waveband may comprise light of green wavelengths, and the fourth waveband may comprise light of infrared wavelengths. Method 400 includes acts 401, 402, 403, 404, and 405, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments.

At 401, the first layer of holographic material is mounted onto a planar transparent surface. The first layer of holographic material may have at least a first surface and a second surface, the second surface positioned across a thickness of the first layer of holographic material from the first surface, wherein the first surface of the first layer of holographic material is physically coupled to a first layer of substrate. The first layer of substrate may have at least a first surface and a second surface, the second surface positioned across a thickness of the first layer of substrate from the first surface and the first surface of the layer of substrate may be physically coupled to the first surface of the first layer of holographic material.

At 402, the first hologram and the second hologram are recorded in the first layer of holographic material by exposing the first layer of holographic material to light in the first waveband and light in the second waveband simultaneously. The specific angles of incidence of the light on the first layer of holographic material will determine the angles of incidence of light that the first hologram and the second hologram are responsive to. If the light in the first waveband and the light in the second waveband were not incident on the first layer of holographic material simultaneously the resulting first hologram and second hologram may not be evenly distributed throughout the first layer of holographic material. For example, if the holographic material is a photopolymer wherein monomers react to light to create polymers, then exposing the holographic material to light sequentially could result in more polymers that are responsive to the first exposure waveband than are responsive to the second exposure waveband. The light in the first waveband has a first power and the light in the second waveband has a second power such that when the first layer of holographic material is simultaneously exposed to the light in the first waveband and the light in the second waveband for a first length of time the index modulation of each of the first hologram and the second hologram is at least 0.016. The power of the light multiplied by the exposure time (in seconds) equals the total energy of light incident on the holographic material. These parameters can be used to determine a value of energy per square dimension of holographic material that results in maximum index modulation. The energy of laser light may be measured in millijoules and the dimension may be measured in centimeters resulting in an ideal $mJ/cm^2$. This value may be achieved using different combinations of power of laser light and exposure time. That is, an ideal $mJ/cm^2$ of 48 may be achieved by exposing the holographic material to 12 mW for 4 seconds, 16 mW for 3 seconds, 6 mW for 8 seconds, etc. A person of skill in the art will appreciate that the particular ideal combination of mW and seconds may further depend on the wavelength of light, the size of the beam, the thickness of the holographic material, etc., and that not every combination of power and time that results in the ideal mJ/cm$^2$ may result in maximum index modulation. The first hologram and the second hologram may also each have diffraction efficiencies of at least 15% and angular bandwidths of at least 12°.

At 403, the second layer of holographic material is mounted onto a planar transparent surface. The second layer of holographic material may have at least a first surface and a second surface, the second surface positioned across a thickness of the second layer of holographic material from the first surface, wherein the first surface of the second layer of holographic material is physically coupled to a second layer of substrate. The second layer of substrate may have at least a first surface and a second surface, the second surface positioned across a thickness of the second layer of substrate from the first surface and the first surface of the layer of substrate may be physically coupled to the first surface of the second layer of holographic material.

At 404, the third hologram and the fourth hologram are recorded in the second layer of holographic material by exposing the first layer of holographic material to light in the third waveband and light in the fourth waveband simultaneously. The specific angle of incidence of the light on the second layer of holographic material will determine the angles of incidence of light to which the third hologram and fourth hologram are responsive. The light in the third waveband has a third power and the light in the fourth waveband has a fourth power such that when the second layer of holographic material is simultaneously exposed to the light in the third waveband and the light in the fourth waveband for a second length of time the index modulation of each of the third hologram and the fourth hologram is at least 0.016. The power of the light multiplied by the exposure time (in seconds) equals the total energy of light incident on the holographic material. These parameters can be used to determine a value of energy per square dimension of holographic material that results in maximum index modulation, as described above at act 402. The third hologram and the fourth hologram may also each have diffraction efficiencies of at least 15% and angular bandwidths of at least 12°. In another implementation, the second layer of holographic material may only be recorded with a third hologram and not a fourth hologram, wherein the third hologram still has an index modulation of at least 0.016, a diffraction efficiency of at least 15%, and an angular bandwidth of at least 12°.

At 405, the first layer of holographic material is adhered to the second layer of holographic material. Where the first layer of holographic material and the second layer of holographic material are physically coupled to a first layer of substrate and a second layer of substrate respectively, the first layer of holographic material and the second layer of holographic material may be adhered by physically coupling the second surface of the first layer of holographic material to the second surface of the second layer of substrate. Alternatively, the first layer of holographic material may be adhered to the second layer of holographic material by physically coupling the second surface of the second layer of holographic material to the second surface of the first layer of substrate. A third layer of substrate may also be added to the HOE which already includes two layers of substrate. The third layer of substrate may have a first surface and a second surface positioned opposite one another across a thickness of the layer. The first surface of the third layer of substrate may be physically coupled to either the second surface of the first layer of holographic material or the second surface of the second layer of holographic material depending on which layer of holographic material has a free second surface following adhesion of the first layer of holographic material to the second layer of holographic material.

The HOE may be physically coupled to an eyeglass lens and the method of producing the HOE may further include adhering the HOE to the eyeglass lens, embedding the HOE between two halves of an eyeglass lens, or forming an eyeglass lens around the HOE.

A person of skill in the art will appreciate that if the fourth waveband comprises light of infrared wavelengths the fourth hologram may need to be recorded by means other than exposing the holographic material to light of infrared wavelengths.

Figure 5:
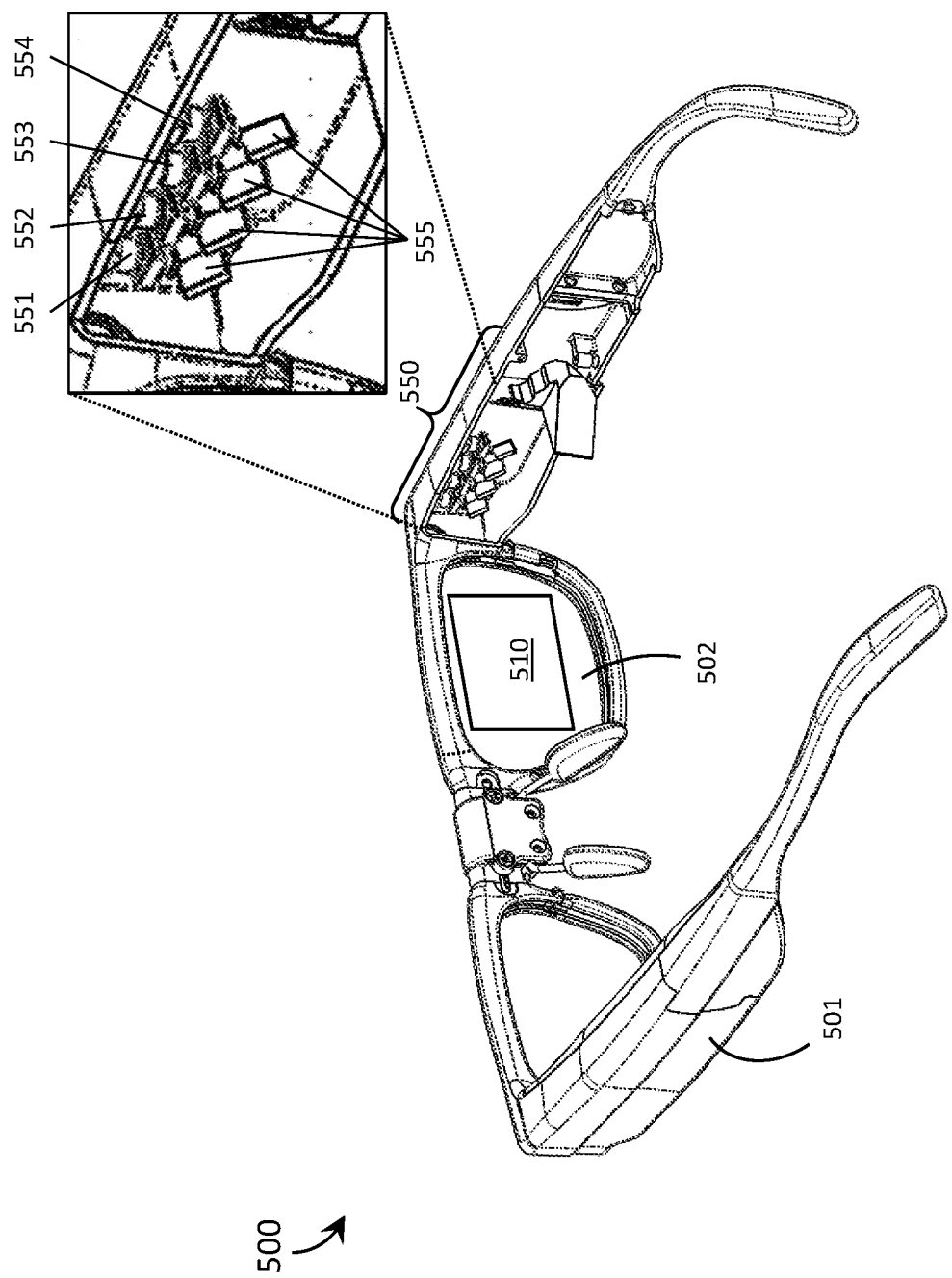
FIG. 5 is an isometric view of a wearable heads-up display with holographic optical element and a laser projector, with a detailed view of a portion thereto, in accordance with the present systems, devices, and methods.

FIG. 5 is an isometric view of a wearable heads-up display (WHUD) 500 with holographic optical element (HOE) 510 and a laser projector 550, with a detailed view of a portion thereto, in accordance with the present systems devices and methods. WHUD 500 includes a support structure 501 that is worn on the head of a user, at least one eyeglass lens 502 carried by the support structure, a HOE 510 physically coupled to eyeglass lens 502, and a laser projector 550. HOE 510 is positioned in the field of view of an eye of the user when the support structure is worn on the head of the user. HOE 510 includes a first layer of holographic material and a second layer of holographic material. The first layer of holographic material includes a first hologram responsive to light in a first waveband and unresponsive to light outside of the first waveband a second hologram responsive to light in a second waveband and unresponsive to light outside the second waveband. The second layer of holographic material includes a third hologram responsive to light in a third waveband and unresponsive to light outside the third waveband and a fourth hologram responsive to light in a fourth waveband and unresponsive to light outside the fourth waveband. The first waveband, second waveband, third waveband, and fourth waveband are all distinct and non-overlapping. The first hologram, second hologram, third hologram, and fourth hologram each have an index modulation of at least 0.016. Each hologram may have a diffraction efficiency of at least 15% and an angular bandwidth of at least 12°. The first waveband comprises light of red wavelengths, the second waveband comprises light of green wavelengths, the third waveband comprises light of blue wavelengths, and the fourth waveband comprises lights of infrared wavelengths. The laser projector (magnified in box) includes a red laser diode 551 to generate laser light in the first waveband, a green laser diode 552 to generate laser light in the second waveband, a blue laser diode 553 to generate laser light in the third waveband, a fourth laser diode 554 to generate laser light in the fourth waveband, a beam combiner 555 to combine the laser light into an aggregate beam, and at least one controllable mirror (not shown) to scan the aggregate beam towards HOE 510. WHUD 500 operates as follows.

Red laser diode 551 generates red laser light, green laser diode 552 generates green laser light, blue laser diode 553 generates green laser light, and infrared laser diode 554 generates infrared laser light. Laser projector 510 may include a processor and a non-transitory processor-readable storage medium to control the generation of light by laser diodes 551, 552, 553, and 554. The red, green, blue, and infrared laser light in combined into an aggregate beam by beam combiner 555. Beam combiner may be comprised of any number of beam splitters, dichroic mirrors, and reflective mirrors. The aggregate beam is directed by the last element of beam combiner 555 towards a controllable mirror which scans the aggregate beam onto HOE 510. Laser projector 550 may include one or more controllable mirrors that may be MEMs mirrors. As the aggregate beam is scanned onto HOE 510, light that is incident on the HOE at the correct angle and the correct wavelength is reflected towards the eye of the user. That is light of a red wavelength that is incident on the first hologram at an angle the first hologram is responsive to will reflect towards the eye of the user to create at least part of an image at the eye of the user. Light of a green wavelength that is incident on the second hologram at an angle that the second hologram is responsive to and light of a blue wavelength that is incident on the third hologram at an angle that the third hologram is responsive to will also be reflected towards the eye of the user to create at least a part of the same image, if the light is incident at the eye of the user simultaneously. In this way, a full color image can be created at the eye of the user. Light of an infrared wavelength that is incident on the fourth hologram at an angle that the fourth hologram is responsive to will be reflected towards the eye of the user but is not visible to the user and therefore does not contribute to the image. The infrared light may be used for other purposes such as tracking the movement of the eye of the user.

A person of skill in the art will appreciate that the various embodiments for holographic optical elements described herein may be applied in non-WHUD applications. For example, the present systems, devices, and methods may be applied in non-wearable heads-up displays and/or in other applications that may or may not include a visible display.

A person of skill in the art will appreciate that the various embodiments for holographic optical elements described herein may be applied in different ways in WHUD applications. That is, a HOE as described herein, may be used to guide light along an optical pathway within a WHUD wherein the light is directed by the HOE to another optical element of the WHUD and not directly to an eye of a user. Therefore, a HOE, as described herein, may not be physically coupled to a lens of a WHUD but may be present elsewhere within or on the WHUD.

A person of skill in the art will appreciate that light sources other than laser diodes may be used in a WHUD, including but not limited to: light-emitting diodes (LED), organic light-emitting diodes (OLED), microLEDs, and/or microdisplays.

In some implementations, one or more optical fiber(s), waveguides, or lightguides may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

Throughout this specification and the appended claims, the term "carries" and variants such as "carried by" or "carrying" are generally used to refer to a physical coupling between two objects. The physical coupling may be direct physical coupling (i.e., with direct physical contact between the two objects) or indirect physical coupling mediated by one or more additional objects. Thus the term carries and variants such as "carried by" are meant to generally encompass all manner of direct and indirect physical coupling.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units, field programmable gate array, application specific integrated circuit, programmable logic controller), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), volatile memory such as Random Access Memory (RAM), memory caches, processor registers; nonvolatile memory such as Read Only Memory, EEPROM, Flash memory, magnetic disks, optical disks; a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Application Publication No. 2016-0377866 A1 US, US Patent Application Publication No. 2016-0377865, US Patent Application Publication No. US 2014-0198034 A1, US Patent Application Publication No. US 2016-0238845 A1, US Patent Application Publication No. US 2014-0198035 A1, Non-Provisional patent application Ser. No. 15/046,234, U.S. Non-Provisional patent application Ser. No. 15/046,254, U.S. Non-Provisional patent application Ser. No. 15/145,576, U.S. Non-Provisional patent application Ser. No. 15/145,609, U.S. Non-Provisional patent application Ser. No. 15/147,638, U.S. Non-Provisional patent application Ser. No. 15/145,583, U.S. Non-Provisional patent application Ser. No. 15/256,148, U.S. Non-Provisional patent application Ser. No. 15/167,458, U.S. Non-Provisional patent application Ser. No. 15/167,472, U.S. Non-Provisional patent application Ser. No. 15/167,484, U.S. Non-Provisional patent application Ser. No. 15/381,883, U.S. Non-Provisional patent application Ser. No. 15/331,204, U.S. Non-Provisional patent application Ser. No. 15/282,535, U.S. Provisional Patent Application Ser. No. 62/271,135 U.S. Provisional Patent Application Ser. No. 62/268,892, U.S. Provisional Patent Application Ser. No. 62/322,128, U.S. Provisional Patent Application Ser. No. 62/420,368, U.S. Provisional Patent Application Ser. No. 62/420,371, U.S. Provisional Patent Application Ser. No. 62/420,380, U.S. Provisional Patent Application Ser. No. 62/438,725, U.S. Provisional Patent Application Ser. No. 62/374,181, U.S. Provisional Patent Application Ser. No. 62/482,062, U.S. Provisional Patent Application Ser. No. 62/557,551, U.S. Provisional Patent Application Ser. No. 62/557,554, U.S. Provisional Patent Application Ser. No. 62/565,677, U.S. Provisional Patent Application Ser. No. 62/573,978, and U.S. Provisional Patent Application Ser. No. 62/487,303, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable heads-up display (WHUD) comprising:
a support structure that in use is worn on a head of a user, the support structure having the general shape and appearance of an eyeglass frame;
at least one eyeglass lens carried by the support structure;
a holographic optical element physically coupled to the at least one eyeglass lens and positioned in a field of view of the user when the support structure is worn on the head of the user, the holographic optical element (HOE) comprising:
a first layer of holographic material that includes a first hologram and a second hologram; and
a second layer of holographic material that includes at least a third hologram, wherein each of the first hologram, the second hologram, and the third hologram has a respective index modulation of at least 0.016, and wherein:
the first hologram is responsive to light in a first waveband and unresponsive to light outside of the first waveband;
the second hologram is responsive to light in a second waveband and unresponsive to light outside of the second waveband;
the third hologram is responsive to light in a third waveband and unresponsive to light outside of the third waveband, wherein the first waveband, the second waveband, and the third waveband are distinct and non-overlapping
and
a laser projector carried by the support structure, the laser projector comprising:
a first laser diode to output laser light in the first waveband;
a second laser diode to output laser light in the second waveband;
a third laser diode to output laser light in the third waveband;
a beam combiner to combine the laser light from the laser diodes into an aggregate beam; and
at least one controllable mirror to scan the aggregate beam over the holographic optical element.

2. The WHUD of claim 1 wherein:
the first waveband, the second waveband, and the third waveband include: a red waveband comprising light of red wavelengths, a green waveband comprising light of green wavelengths, and a blue waveband comprising light of blue wavelengths.

3. The WHUD of claim 1, wherein:
the at least a third hologram includes a fourth hologram that is responsive to light in a fourth waveband and unresponsive to light outside of the third waveband, wherein the fourth waveband is distinct from the first waveband, the second waveband, and the third waveband with no overlap therebetween; and
the laser projector further includes a fourth laser diode to output laser light in a fourth waveband.

4. The WHUD of claim 3 wherein:
the first waveband, the second waveband, the third waveband, and the fourth waveband include: a red waveband comprising light of red wavelengths, a green waveband comprising light of green wavelengths, a blue waveband comprising light of blue wavelengths, and an infrared waveband comprising light of infrared wavelengths.

5. The WHUD of claim 1 wherein the at least one eyeglass lens and the HOE are curved.

6. The WHUD of claim 1 wherein a respective diffraction efficiency of each of the first hologram, the second hologram, and the third hologram is at least 15%.

7. The WHUD of claim 1 wherein a respective angular bandwidth of each of the first hologram, the second hologram, and the third hologram is at least 12°.

8. The WHUD of claim 1 wherein the first layer of holographic material and the second layer of holographic material have a thickness not greater than 8 μm.

9. The WHUD of claim 1 wherein the holographic material is a photopolymer.

* * * * *